United States Patent [19]

Pitchford et al.

[11] Patent Number: 5,553,892
[45] Date of Patent: Sep. 10, 1996

[54] MULTIPLE-CHANNEL PLURAL-POSITION GAS RAIL AND BRACKET MOUNT THEREFOR

[75] Inventors: Eric V. Pitchford; Gerald E. Proctor, both of Pittsburgh; William Boehmer, Clairton, all of Pa.

[73] Assignee: Fairfield Medical Products Corporation, Tampa, Fla.

[21] Appl. No.: 317,696

[22] Filed: Oct. 5, 1994

[51] Int. Cl.$^6$ .................................................. F16L 25/08
[52] U.S. Cl. .............................. 285/12; 285/64; 285/119; 285/137.1; 248/65
[58] Field of Search ................................. 248/65; 285/61, 285/62, 63, 64, 12, 119, 137.1

[56] References Cited

U.S. PATENT DOCUMENTS

| | | | |
|---|---|---|---|
| 2,645,783 | 7/1953 | Allen | 285/137.1 X |
| 3,004,330 | 10/1961 | Wilkins. | |
| 4,082,324 | 4/1978 | Obrecht | 285/137.1 |
| 4,498,693 | 2/1985 | Schindele. | |
| 4,718,699 | 1/1988 | Kulish et al.. | |
| 4,807,659 | 2/1989 | Schindele | 285/137.1 X |
| 4,975,055 | 12/1990 | LaPlante. | |
| 5,044,583 | 9/1991 | Daigle | 248/65 X |
| 5,197,511 | 3/1993 | Kohn et al.. | |
| 5,236,016 | 8/1993 | Vogelsang. | |

*Primary Examiner*—Dave W. Arola
*Attorney, Agent, or Firm*—Jones & Askew

[57] ABSTRACT

A gas rail includes, preferably, three conduits designed to convey vacuum, pressurized oxygen and air, respectively, for a fluid flow system designed to be located in a hospital room. The gas rail includes a fluid coupling for each conduit so that each conduit may be coupled to its respective source as well as to its ultimate destination. The gas rail is mounted on a wall in the hospital room by virtue of a bracket mount with the gas rail and the bracket mount having interengaging portions permitting the gas rail to be mounted to the bracket mount in any one of two distinct, diverse orientations. The bracket mount also has the provision of structure permitting installation of a clip designed to retain electrical conductors which may be mounted in the bracket mount.

14 Claims, 3 Drawing Sheets

MULTIPLE-CHANNEL PLURAL-POSITION GAS RAIL AND BRACKET MOUNT THEREFOR

BACKGROUND OF THE INVENTION

The present invention relates to a multiple-channel plural-position gas rail and bracket mount therefor. In the prior art, it is known to provide a single piece component having a plurality or multiplicity of fluid flow conduits traveling therethrough. However, Applicants are unaware of any such device having all of the features and aspects of the present invention including, particularly, the interaction with the associated bracket permitting mounting in any one of two diverse orientations.

The following prior art is known to Applicants:

U.S. Pat. No. 3,004,330 to Wilkins discloses a tubular member having a plurality of passageways therethrough. Wilkins fails to contemplate the bracket mount nor the interaction between a gas rail and a bracket mount to permit mounting of the gas rail thereto in plural positions.

U.S. Pat. No. 4,498,693 to Schindele discloses a rail system with passageways for the conduction of fluid flow. Threaded couplings are employed to couple each rail to fluid conduits. A mounting plate is provided which permits mounting of the rail system on an adjacent wall surface. Schindele fails to contemplate the interaction between the bracket mount and the gas rail as disclosed herein and which permits mounting of the gas rail in two different orientations or positions with respect to the mount.

U.S. Pat. No. 4,718,699 to Kulish et al. discloses a gas system outlet station assembly which includes a keying system permitting specific keying for a large number of gas services. Kulish et al. fail to contemplate a gas rail interacting with a bracket mount therefor which permits mounting of the gas rail in any one of a plurality of orientations or positions with respect to the mount.

U.S. Pat. No. 4,975,055 to LaPlante discloses a flexible conduit structure for dental appliances. LaPlante fails to contemplate the unique way in which the gas rail of the present invention may be mounted to the bracket mount thereof in any one of a plurality of positions or orientations.

U.S. Pat. No. 5,197,511 to Kohn et al. discloses a fluid outlet system designed to permit selective providing of a plurality of fluids such as oxygen medical air and vacuum at different locations. While this patent is directed to the same general environment of the present invention, Kohn et al. fail to teach or suggest the structural interaction between the gas rail and the bracket mount which is disclosed herein.

U.S. Pat. No. 5,236,016 to Vogelsang discloses a cable-guide assembly of plastic tubes joined by webs. While this patent teaches the concept of a single modular device having a plurality of fluid conduits extending therethrough, there is no teaching or suggestion therein of the interaction between a gas rail and a bracket mount such as that which is contemplated herein.

SUMMARY OF THE INVENTION

The present invention relates to a multiple-channel plural-position gas rail and bracket mount therefor. The present invention includes the following interrelated objects, aspects and features:

(A) In a first aspect of the present invention, a gas rail is preferably made of one piece and includes three fluid conduits extending longitudinally therethrough. Couplings are provided on the gas rail both to supply and exhaust fluid thereto and therefrom respectively.

(B) The inventive gas rail includes a plurality of flanges depending outwardly therefrom and, preferably, integrally formed therewith. These flanges interact with a bracket mount, as will be described in greater detail hereinafter, to permit mounting of the gas rail to the bracket mount in any one of two diverse positions or orientations thereof.

(C) The above-described bracket mount is generally L-shaped with one "leg" of the L-shape having openings therethrough designed to receive mounting screws to mount the bracket mount on a convenient, adjacent wall surface. The bracket mount has a plurality of grooves which are specifically designed to interact with the above-mentioned flanges on the gas rail to permit mounting of the gas rail on the bracket mount in any one of two different positions or orientations.

(D) Additional grooves are provided on the bracket mount which are designed to receive a wiring harness called an ANTI-PASTA™ clip which is specifically provided to allow mounting and enclosure of a plurality of electrical conductors.

Accordingly, it is a first object of the present invention to provide a multiple-channel plural-position gas rail and bracket mount therefor.

It is a further object of the present invention to provide such a device wherein the bracket mount thereof may be mounted to a convenient wall surface.

It is a yet further object of the present invention to provide such a device wherein the gas rail thereof may be mounted on the bracket mount in any one of a plurality of positions and orientations thereof.

It is a still further object of the present invention to provide such a device wherein the bracket mount thereof includes structure designed to receive a clip which receives and retains a plurality of electrical conductors.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
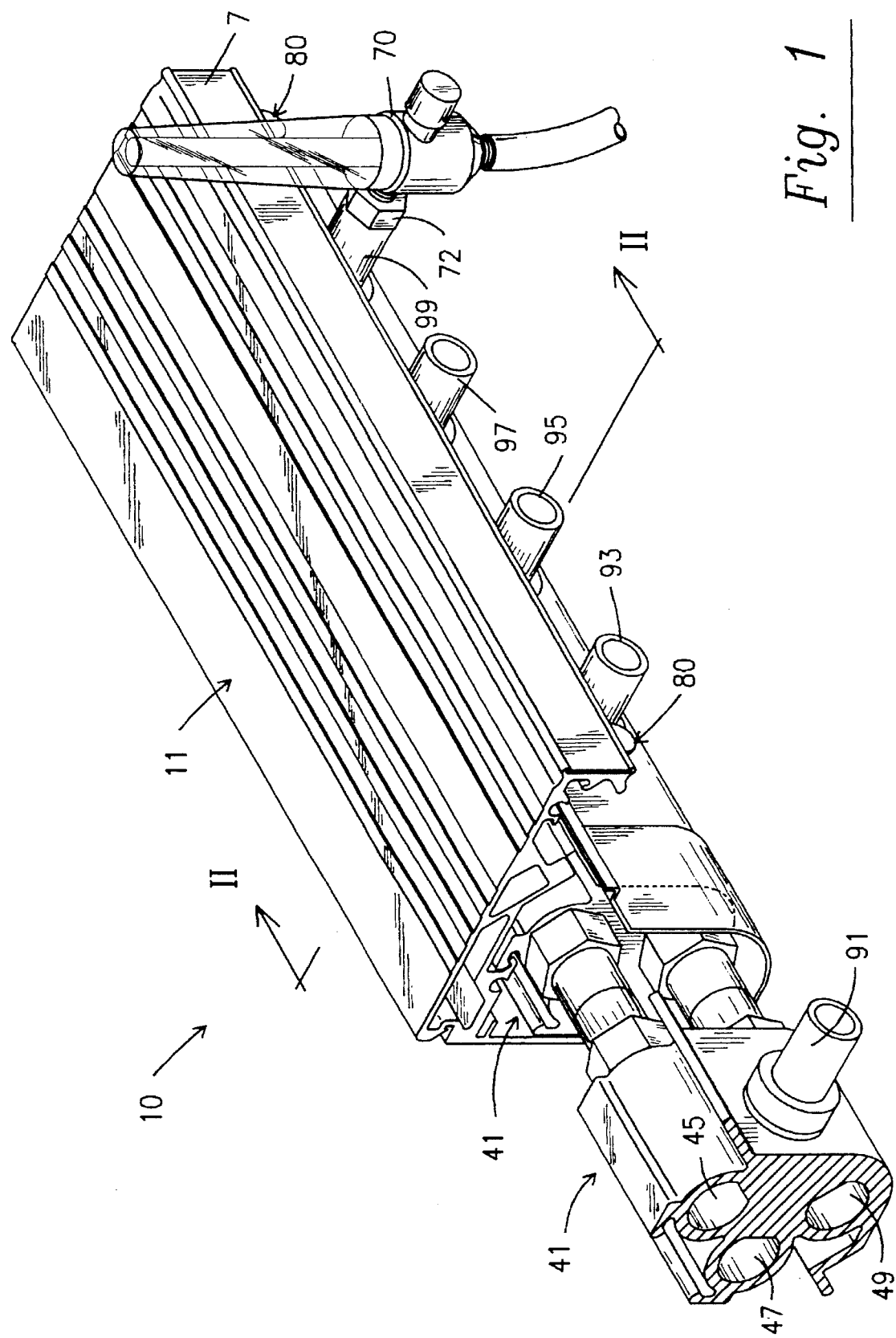
FIG. 1 shows an isometric view of the present invention with a portion thereof shown in cross-section to show detail.
Figure 2:
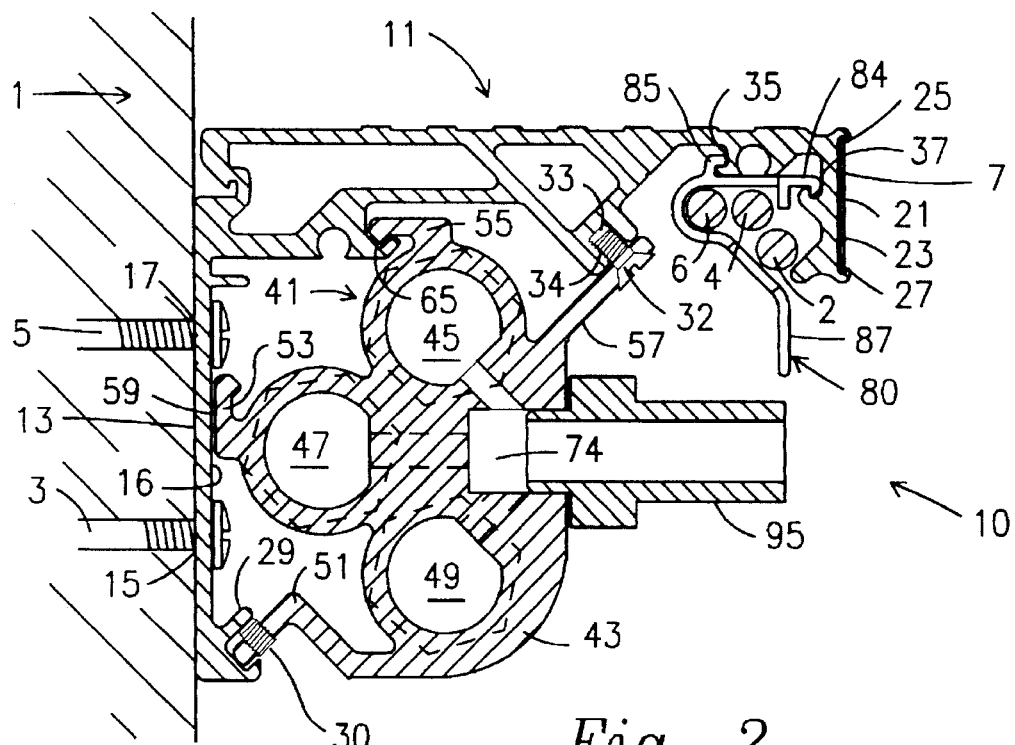
FIG. 2 shows a cross-sectional view along the line II—II of FIG. 1.
Figure 3:
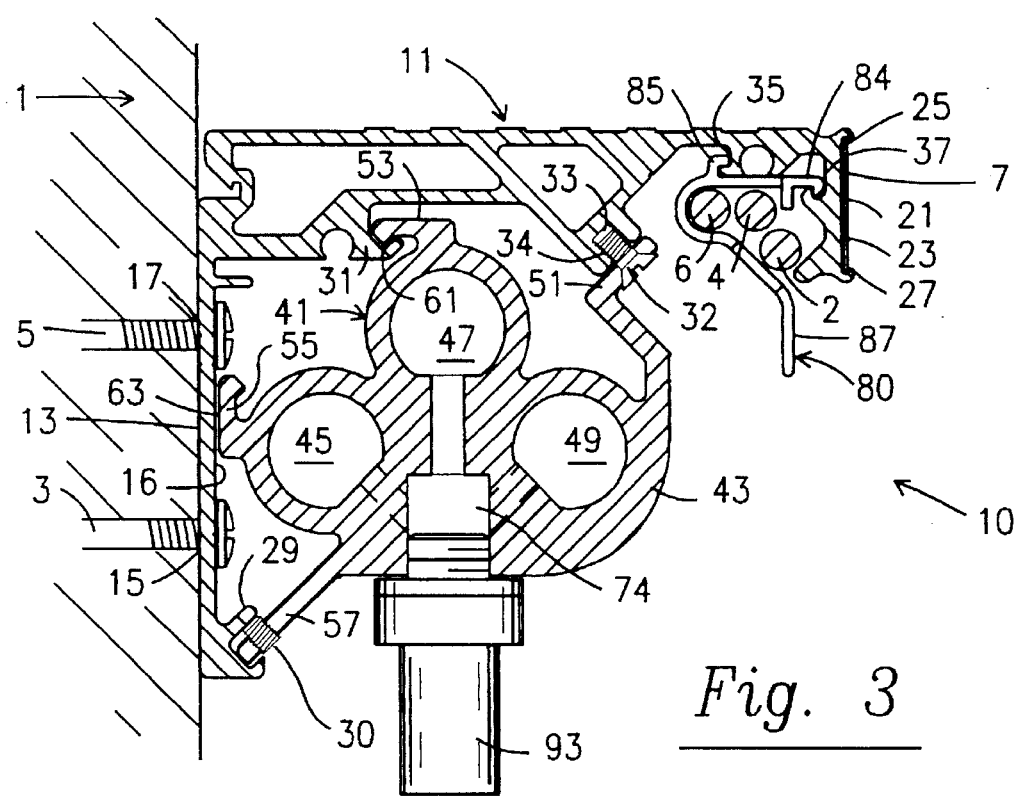
FIG. 3 shows a further cross-sectional view of the present invention but with the gas rail in a different position and orientation with respect to the bracket mount as compared to the view FIG. 2.

The present invention is particularly shown in FIGS. 1, 2 and 3 and is generally designated therein by the reference numeral 10. The present invention is seen to include a bracket mount 11 of generally L-shaped configuration in combination with a gas rail generally designated by the reference numeral 41.

Figure 4:
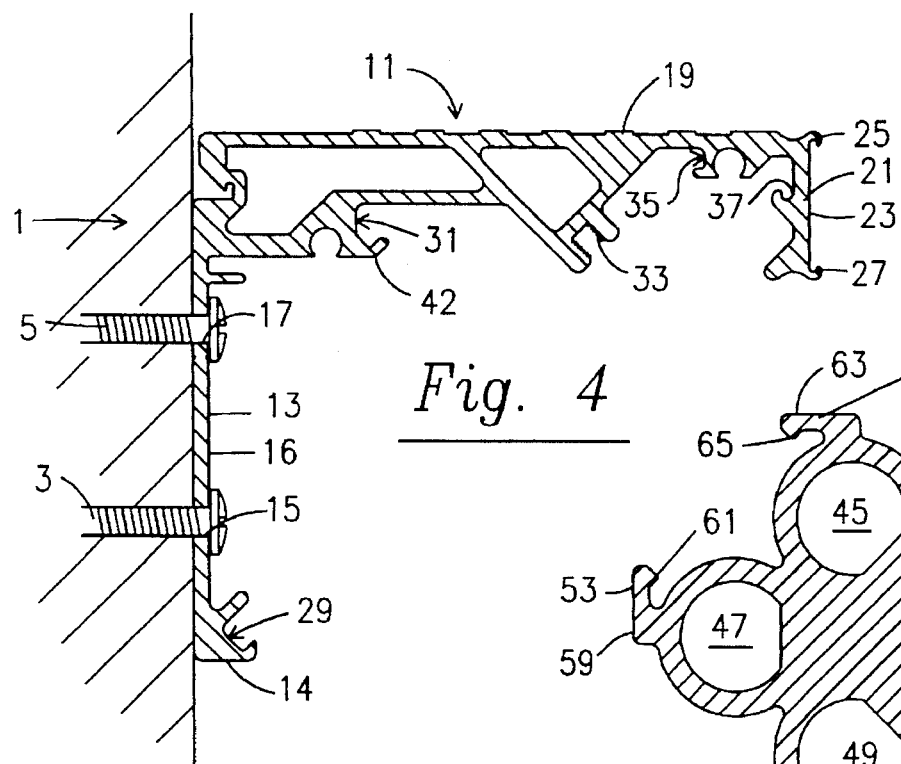
FIG. 4 shows a cross-sectional view through the bracket mount with the gas rail removed therefrom to show detail.

With particular reference to FIG. 4, the bracket mount 11 is shown in its preferred orientation with respect to the vertical surface or wall 1. As shown in FIG. 4, the bracket mount 11 has a vertical portion 13 having holes 15, 17 therethrough which respectively receive screws 3, 5 which are threadably received within the vertical surface or wall 1 to mount the bracket mount 11 in the position and orientation shown in FIGS. 1–4.

The bracket mount 11 further includes a horizontal portion 19 which terminates at a downwardly depending lip 21 which includes a face 23 defined by upper and lower grooves 25 and 27, respectively. The grooves 25 and 27 are intended to releasably receive a decorative piece of trim 7 as particularly shown in FIG. 1.

With further reference, in particular, to FIG. 4, the vertical portion 13 includes a orienting groove 29 therein which is adjacent the lower terminus 14 of the vertical portion 13. The vertical portion 13 also has a generally flat inner wall 16 between the holes 15 and 17 for a purpose to be described in greater detail hereinafter.

The horizontal portion 19 includes a supporting groove 31 as well as a positioning groove 33. The horizontal portion also includes a fourth groove 35 and a fifth groove 37. The significance of the grooves 29, 31, 33, 35 and 37 will be described in greater detail hereinafter.

Figure 5:
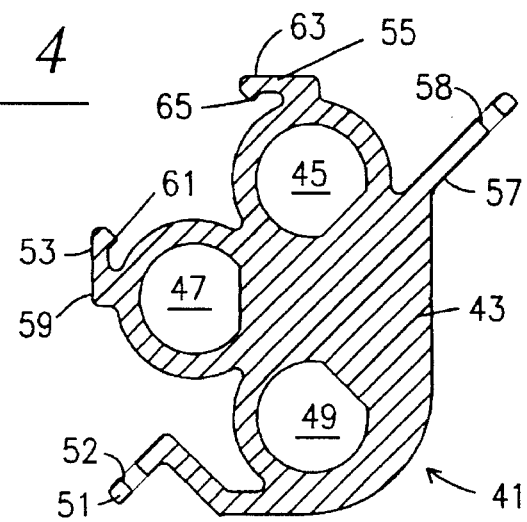
FIG. 5 shows a cross-sectional view through the gas rail.

With reference to FIG. 5, in particular, and also to FIGS. 2 and 3, the gas rail 41 is seen to include a body 43 which includes passageways 45, 47 and 49 therethrough. These passageways are designed to convey vacuum, pressurized oxygen and air respectively therethrough. As will be explained in greater detail hereinafter, various fluid couplings are provided to supply fluids to the conduits 45, 47 and 49 and to exhaust fluids therefrom. Channels from the conduits flow at different angles to a central collector 74 from which the fluid exits to a coupler located in a horizontal line, as seen in FIG. 1, for couplers 91, 95 and 99.

With reference to FIG. 5 as well as to FIGS. 2 and 3, the gas rail 41 includes a first locking flange 51, a second supporting flange 53, a first supporting flange 55 and a second locking flange 57. As shown, the flange 51 has an opening 52 therethrough designed to receive a mounting screw. Similarly, the flange 57 has an opening 58 therethrough designed to receive a screw. Such screws are particularly shown in FIGS. 2 and 3.

Furthermore, the flange 53 includes a flat outer surface 59 as well as a tapered termination 61. Similarly, the flange 55 has a flat outer wall 63 and a tapered termination 65. The flat outer walls 59, 63 and the tapered terminations 61, 65 are provided for purposes to be described in greater detail hereinafter.

With reference, now, to FIG. 2, it is seen that the gas rail 41 can be mounted on the bracket mount 11 in a first orientation with respect thereto. In the orientation shown in FIG. 2, the flange 51 is mounted to the groove 29 through the use of an adjustable screw 30 extending through the opening 52 in the flange 51 and received within an opening (not shown) in the groove 29. The flange 57 is mounted to the groove 33 by a similar fastener 32 extending through the opening 58 in the flange 57 and received within an opening 34 in the groove 33.

The flat surface 59 of the flange 53 rests upon the corresponding flat surface 16 of the vertical portion 13 of the bracket mount 11. The groove 31 in the bracket mount 11 receives the flange 55 of the gas rail 41 with the tapered termination 65 thereof received within a corresponding surface 42 (FIG. 4) of the groove 31.

With reference now to FIG. 3, a second mountable orientation of the gas rail 41 with respect to the bracket mount 11 is shown. As shown in FIG. 3, a second position and orientation of mounting of the gas rail 41 to the bracket mount 11 is as follows: the flange 57 is mounted to the groove 29 by the adjustable screw 30 extending through the opening 58 in the flange 57 and received within the opening of the groove 29. The flange 51 is mounted to the groove 33 via the fastener 32 which extends through the opening 52 in the flange 51 and thence is received in the opening 34 of the groove 33. The flat surface 63 of the flange 55 rests against the flat inner wall 16 of the vertical portion 13 of the bracket mount 11. The flange 53 is mounted on the groove 31 with the depending portion 61 of the flange 53 being received within a corresponding recess 42 of the groove 31. In order to achieve the orientation of the gas rail 41 as shown in FIG. 3 as compared to the orientation thereof as shown in FIG. 2, the gas rail 41 is rotated in direction and position to the orientation shown.

Figure 6:
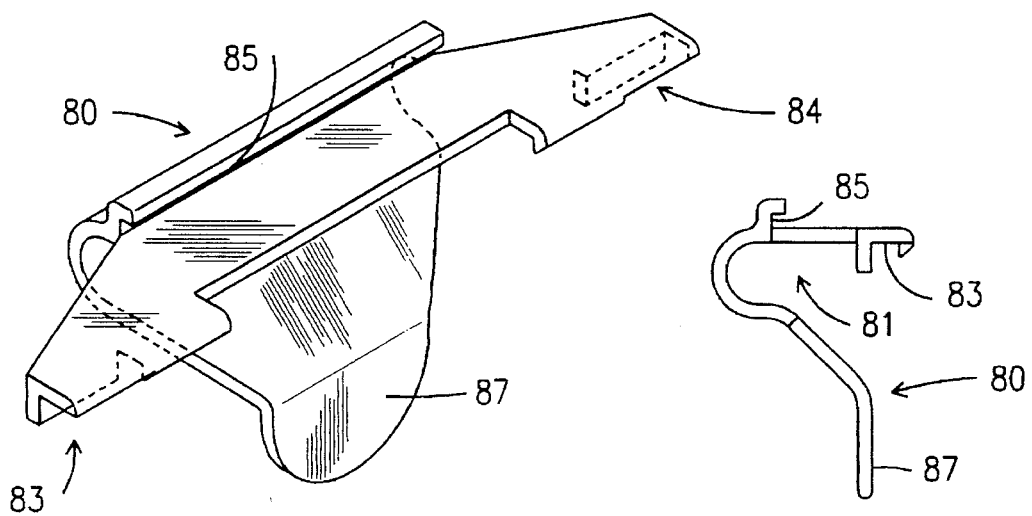
FIG. 6 shows an isometric view of the ANTI-PASTA™ clip of the present invention.
Figure 7:
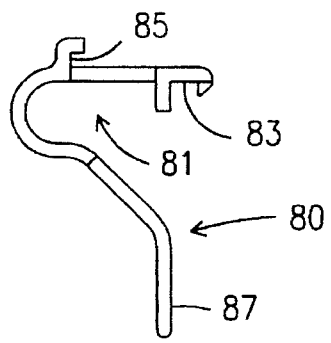
FIG. 7 shows an end view of the ANTI-PASTA™ clip shown in FIG. 6.

With reference now to FIGS. 6 and 7, an ANTI-PASTA™ clip 80 is seen to include parallel, spaced flanges 83 and 84, a further flange 85 and a depending portion 87. A chamber 81 is formed by the surface of the clip 80 between the flange 85 and the depending portion 87.

As particularly shown in FIGS. 2 and 3, the clip 80 is installed in the bracket mount 11 with the flanges 83 and 84 engaging the groove 37 and with the flange 85 engaging the groove 35. The depending portion 87 is employed to install the clip 80 in place. As shown in FIGS. 2 and 3, the clip 80 is designed to enclose and retain electrical conductors 2, 4 and 6 which may provide power to various appliances within a hospital room while also being capable of conveying signals from monitoring equipment within a hospital room to a remote location where monitoring may take place.

As shown in FIGS. 1, 2 and 3, various fluid couplers 91, 93, 95, 97 and 99 are shown. With reference to FIG. 2, the coupler 95 is seen to fluidly connect the conduit 45 and, with reference to FIG. 3, the coupler 93 is seen to fluidly connect with the conduit 47. The particular means of connection between the couplers 91, 93, 95, 97 and 99 and the conduits 45, 47 and 49 are in conformity with common industry plumbing practice. A flow meter 70 is connected to horizontal couplers 91, 95 and 99 with a locking nut 72.

Furthermore, in the preferred embodiment of the present invention, the bracket mount 11 and the gas rail 41 are made of metal through any suitable process such as extrusion, stamping, etc. If desired, however, these components may suitably be made of plastic or other appropriate material. Similarly, the clip 80 may be made of any desired material such as metal or plastic.

As such, an invention has been described in terms of a preferred embodiment thereof which fulfills each and every one of the objects and aspects of the present invention as set forth hereinabove and provides a new and useful multiple-channel plural-position gas rail and bracket mount therefor of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

We claim:

1. A combination bracket mount and gas rail comprising:

a) a bracket mount of generally L-shaped configuration having a substantially vertical portion adapted to be attached to a substantially vertical surface and a substantially horizontal portion depending therefrom, said vertical portion having a orienting groove spaced from said horizontal portion and said horizontal portion having a supporting groove spaced from said vertical portion;

b) a gas rail comprising a body including a plurality of fluid conduits therein, coupling means for coupling said conduits with respective sources and end users of fluid;

said gas rail having a first supporting flange and a second supporting flange angularly disposed with respect to one another, each of said flanges having a depending termination complementary with said supporting groove;

d) said gas rail having a first locking flange and a second locking flange;

e) said gas rail being mountable on said bracket mount in either one of two orientations with respect thereto, a first orientation whereby said first supporting flange is received by said supporting groove and said first locking flange is mounted to said orienting groove, and a second orientation whereby said second supporting flange is received by said supporting groove and said second locking flange is mounted to said orienting groove.

2. The combination of claim 1, wherein said first locking flange is opposed to said second locking flange.

3. The combination of claim 2, wherein said bracket mount vertical portion is perpendicular to said bracket mount horizontal portion.

4. The combination of claim 1, wherein said plurality of conduits comprises three conduits.

5. The combination of claim 1, wherein said bracket mount horizontal portion furthers comprises a positioning groove spaced from said vertical portion.

6. The combination of claim 5, wherein said first locking flange and second locking flange lie in a common plane.

7. The combination of claim 5, wherein said in said first orientation, said second locking flange is mounted to said positioning groove.

8. The combination of claim 7, wherein locking flange is mounted to said positioning groove by a fastening means.

9. The combination of claim 8 wherein said fastening means comprises at least one screw.

10. The combination of claim 1, wherein said bracket mount has a first end and a second end, said gas rail having a first end and a second end, whereby, in said first orientation, said bracket mount first end is adjacent said gas rail first end and in said second orientation, said bracket mount first end is adjacent said gas rail second end.

11. The combination of claim 1, wherein the supporting groove of the bracket mount has a hook-like configuration.

12. A utility supply apparatus, comprising a gas rail having a body including a plurality of fluid conduits therein, coupling means for coupling said conduits with respective sources and end users of fluid, said gas rail having a first flange and a second flange angularly disposed with respect to one another, each of said flanges having a depending termination adapted to engage a complementary structure to mount said gas rail thereto; and an electrical clip holding electrical conductors adapted to engage said complementary structure, wherein said gas rail and said electrical clip are mounted to said complementary structure in a substantially parallel manner.

13. The gas rail of claim 12, wherein said complementary structure comprises a groove formed on a bracket mount.

14. The gas rail of claim 12, wherein said plurality of conduits comprises three conduits.

* * * * *